(12) United States Patent
Fall et al.

(10) Patent No.: US 7,073,670 B2
(45) Date of Patent: Jul. 11, 2006

(54) HIGH CAPACITY DEPTH FILTER BAG

(75) Inventors: Ronald E. Fall, Carmel, IN (US); John Ruddock, Westfield, IN (US)

(73) Assignee: Parker-Hannifin Corporation, Cleveland, OH (US)

(*) Notice: Subject to any disclaimer, the term of this patent is extended or adjusted under 35 U.S.C. 154(b) by 161 days.

(21) Appl. No.: 10/219,192

(22) Filed: Aug. 14, 2002

(65) Prior Publication Data

US 2003/0038073 A1   Feb. 27, 2003

Related U.S. Application Data

(60) Provisional application No. 60/314,040, filed on Aug. 22, 2001.

(51) Int. Cl.
*B01D 27/06* (2006.01)

(52) U.S. Cl. .............. 210/452; 210/477; 210/474; 210/484; 210/495

(58) Field of Classification Search ............... 210/437, 210/452, 457, 484, 497.1, 495, 474, 477; 248/94
See application file for complete search history.

(56) References Cited

U.S. PATENT DOCUMENTS

| | | | | |
|---|---|---|---|---|
| 329,505 | A | * 11/1885 | Teeter | 210/474 |
| 462,076 | A | * 10/1891 | Devoll | 248/94 |
| 1,168,544 | A | * 1/1916 | Newlin | 248/94 |
| 3,871,850 | A | 3/1975 | Lenane | 55/486 |
| 4,102,785 | A | 7/1978 | Head et al. | 210/65 |
| 4,164,400 | A | 8/1979 | Wald | 55/382 |
| 4,204,966 | A | 5/1980 | Morgan, Jr. | 210/455 |
| 4,211,661 | A | 7/1980 | Perry | 210/491 |
| 4,257,791 | A | 3/1981 | Wald | 55/382 |
| 4,419,240 | A | 12/1983 | Rosaen | 210/444 |
| 4,435,197 | A | 3/1984 | Nijhawan et al. | 55/341 R |
| 4,495,072 | A | * 1/1985 | Fields | 210/238 |
| 4,655,920 | A | 4/1987 | Ragnegard | 210/331 |
| 4,769,052 | A | * 9/1988 | Kowalski | 210/315 |
| 4,913,815 | A | 4/1990 | Shulda | 210/287 |
| 4,917,942 | A | 4/1990 | Winters | 428/286 |
| 5,015,376 | A | 5/1991 | Picek | 210/317 |
| 5,250,179 | A | * 10/1993 | Spearman | 210/315 |
| 5,269,921 | A | 12/1993 | Ruger et al. | 210/282 |
| 5,358,638 | A | 10/1994 | Gershenson | 210/448 |

(Continued)

FOREIGN PATENT DOCUMENTS

EP   0650750   5/1995

(Continued)

OTHER PUBLICATIONS

Copy of International Search Report from corresponding PCT Application No. PCT/US02/25637.

*Primary Examiner*—Terry K. Cecil
(74) *Attorney, Agent, or Firm*—Christopher H. Hunter (57) ABSTRACT

A filter element for hydrocarbon emissions in, e.g., marine diesel engine applications, comprises a wound mat received within a filter bag. An annular end cap is bonded to one end of the wound mat, and is sealed around its periphery to a bag ring at the open end of the bag. The bag ring is then received and retained in a seat ring in the housing. The exhaust gas stream from the engine is directed through an opening in the end cap and through the wound mat and bag for removal of hydrocarbons and contaminants.

5 Claims, 7 Drawing Sheets

| U.S. PATENT DOCUMENTS | | | | FOREIGN PATENT DOCUMENTS | | |
|---|---|---|---|---|---|---|
| 5,376,271 A | 12/1994 | Morgan, Jr. | | EP | 0880987 | 12/1998 |
| 5,560,757 A | 10/1996 | Suzuki et al. ............... 210/447 | | EP | 1070530 | 1/2001 |
| 5,624,559 A * | 4/1997 | Levin et al. ................ 210/447 | | GB | 880537 | 10/1961 |
| 5,980,759 A * | 11/1999 | Proulx et al. ............... 210/489 | | GB | 1232231 | 5/1971 |
| 5,989,421 A * | 11/1999 | Davis et al. ................ 210/232 | | WO | 97/24169 | 7/1997 |
| 6,006,924 A * | 12/1999 | Sandford .................... 210/440 | | WO | 00/21640 | 4/2000 |
| 6,136,192 A * | 10/2000 | Booth et al. ................ 210/450 | | | | |
| 6,277,284 B1 | 8/2001 | Nohren ....................... 210/660 | | * cited by examiner | | |

HIGH CAPACITY DEPTH FILTER BAG

CROSS-REFERENCE TO RELATED CASES

The present application claims the benefit of the filing date of U.S. Provisional Application Ser. No. 60/314,040; filed Aug. 22, 2001, the disclosure of which is expressly incorporated herein by reference.

BACKGROUND OF THE INVENTION

The present invention relates to filters for separating hydrocarbons and contaminants from liquid streams.

The containment, collection and prevention of the discharge of diesel oil present as unburned fuel in diesel engine exhaust, and the reduction of particulate and other contaminants in emissions from diesel engines, is an on-going issue. In marine applications, stringent laws (e.g., 33 USC 2702 "The Oil Pollution Act") have been enacted to protect the environment, which have necessitated the significant control of emissions to avoid costly fines. Similar emphasis has been placed on reducing emissions from heavy duty trucks and public transportation busses.

One known technique for removing hydrocarbons from an exhaust stream is to direct the dry exhaust stream through a filter. The filter typically includes one or more filter elements in a cartridge form, for example with high-temperature ceramic fiber wound in a diamond form around a perforated support tube. The flow is outside-in, with the support tube fluidly connected at its downstream end to the outlet in the filter housing, and then to atmosphere. The elements can be connected in parallel, or in series. The ceramic fiber used in this application is typically a significant expense.

Fiber mats comprising aromatic polyamides are also known for removing hydrocarbons from the dry exhaust gas stream (see, for example, U.S. Pat. No. 3,871,850). It is believed such mats provide good filtration, but hydrocarbons are particularly difficult to remove from a gas stream and can quickly clog such a mat. A clogged element can cause unacceptable pressure drop across the filter, and require frequent replacement. As can be appreciated, the frequent replacement of cartridges increases maintenance expenses and can interrupt the continued use of the boat.

Another known technique for reducing emissions from diesel engines is to first "scrub" the emissions. In this technique, the gas stream is impacted on water in a closed chamber. The stream is cooled and the velocity of the stream is reduced. Some of the oil collects directly on the surface of the water, while the remainder of the oil is absorbed (emulsified) in the water, and then floats to the surface. Aromatic hydrocarbons and related fumes and particulate are also absorbed and contained during the water/gas contact cycle. The oil and particulate in the water are then collected such as by a pick-up tube, and processed by an oily water separator or filtration system. One such scrubber is manufactured by EcoSound of Tarpon Springs, Fla., under the mark/designation EPS 5000 Exhaust Processing System.

While a scrubber has certain advantages over a dry gas filtration system, The filter elements useful for processing the collected hydrocarbons in such scrubber systems have also generally been expensive and/or have lasted for only a short period of time before requiring replacement. Thus, the drawbacks have remained primarily the same as with dry exhaust filters.

Thus, it is believed there is a demand in the industry for a filter which removes emissions and other contaminants from diesel exhaust gasses, particularly in marine applications, which has a reduced cost, is simple to manufacture, install and maintain, and has an improved operating life before replacement is necessary. It is believed the demand is great for such a filter particularly in scrubber systems to remove hydrocarbons and other contaminants from a liquid stream passing through the scrubber.

SUMMARY OF THE INVENTION

The present invention provides a filter element, particularly for marine diesel engine applications, which removes hydrocarbon emissions and contaminants from exhaust gas. The present invention is particularly useful for removing hydrocarbons in a liquid stream from a scrubber, but can also be useful for removing hydrocarbons and other contaminants directly from a dry exhaust stream. The filter of the present invention has a reduced cost, is simple to manufacture, install and maintain, and has an improved operating life before replacement is necessary.

According to the present invention, the filter element comprises an inner mat received within an outer filter bag. In a preferred embodiment, both the bag and the mat are formed from needled polypropylene mat material. The mat is rolled around a central perforated support core in multiple windings, and then inserted into the bag. The outer bag has a density (efficiency) preferably greater than the inner mat material, such that the inner mat acts as an initial separator of emissions and contaminants, while the outer bag acts as a final separator. The unique combination of a rolled inner mat and an outer filter bag increases the useful life of the filter.

An end cap is located at one end of the filter, and includes a central opening which receives and is sealed to the central support core. The periphery of the end cap is sealed to a bag ring at the open end of the bag, which is then sealingly captured by the canister when the element is inserted into the canister. The opening in the end cap receives the exhaust stream from the scrubber received through an inlet in the canister. The exhaust stream is then directed down through the central support core, and radially outward through the inner mat and the outer bag, where hydrocarbons and contaminants are removed. The hydrocarbon-free and contaminant-free stream is then directed to an outlet port in the canister, and in a marine application, to a discharge port on the side of the boat.

It is preferred that the filter element be removably located in a filter canister, such that the element can be removed, inspected and replaced, when the element becomes spent. The element is also preferably formed from "green" material, such that it can be easily incinerated or otherwise disposed of in an environmentally friendly manner. Appropriate locating and retaining mechanisms can be provided between the bag ring and the canister to ensure the element is properly located in the canister, and to ensure a correct element is used for a particular application.

Further features of the present invention will become apparent to those skilled in the art upon reviewing the following specification and attached drawings.

DETAILED DESCRIPTION OF THE PREFERRED EMBODIMENT

Figure 1:
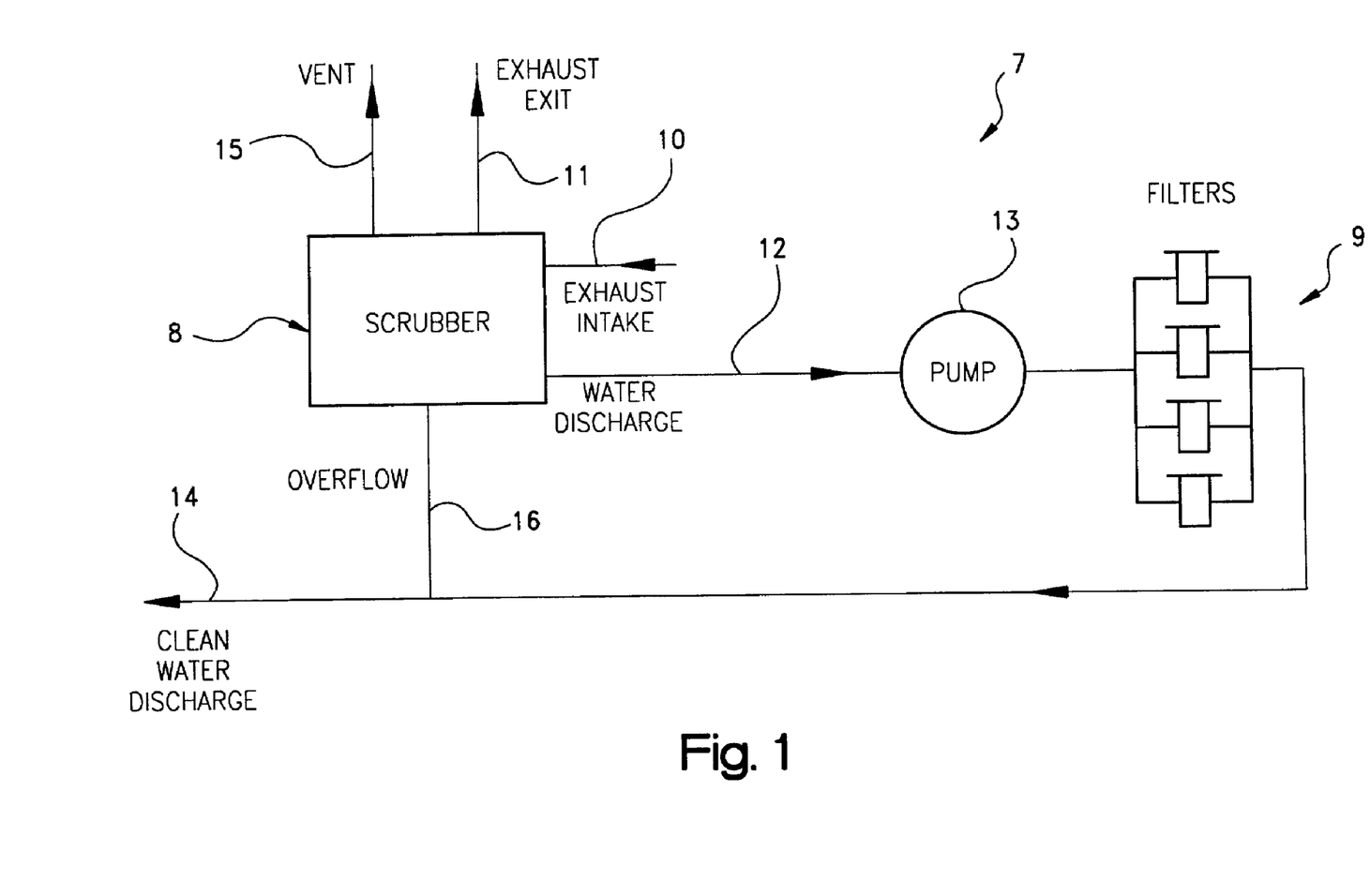
FIG. 1 is a schematic illustration of a scrubber system including filter assemblies constructed according to the principles of the present invention.

Referring to the drawings, and initially to FIG. 1, an exhaust gas processing system is indicated generally at 7, and includes a scrubber, indicated generally at 8, and a filter stack, indicated generally at 9. The scrubber receives exhaust from an engine along an intake line 10, and processes the exhaust gas by removing hydrocarbons and contaminants, before the gas is directed through exhaust exit line 11. Discharge fluid (water), including the removed hydrocarbons and contaminants, exits the scrubber along line 12 and is applied through pump 13 to the filter stack 9. As will be described below, the filter stack 9 removes the hydrocarbons and contaminants from the water, and discharges clean water overboard via line 14. The filters in the filter stack retain the hydrocarbons and contaminants and can be removed and replaced when spent. The scrubber also includes a vent line 15, and an overflow line 16 to the discharge line 14.

The scrubber system described above is a commercial scrubber system available from EcoSound of Tarpon Springs, Fla., under the mark/designation EPS 5000 Exhaust Processing System, and is useful in marine craft to remove hydrocarbons and contaminants from the exhaust gas of diesel engines. It is noted that the present invention is not limited to any particular type of scrubber system; and in fact is not even limited to use solely in conjunction with a scrubber. Rather it is believed the present invention is useful in a variety of applications where it is necessary to remove hydrocarbons and/or contaminants from a fluid (liquid or gas) stream.

Figures 2, 4:
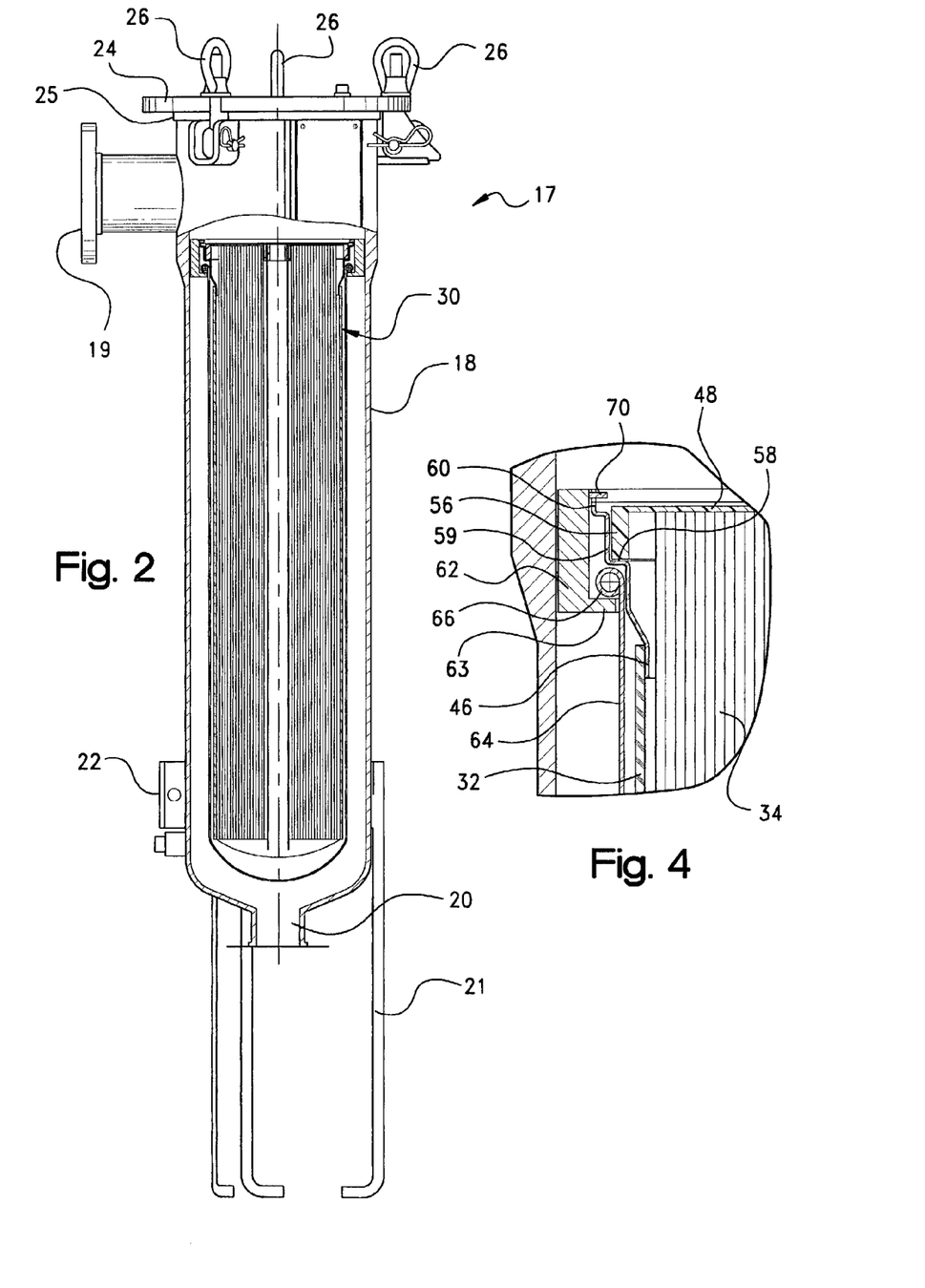
FIG. 2 is a cross-sectional side view of a filter assembly for the scrubber system of FIG. 1.
FIG. 4 is a further enlarged view of a portion of the assembly shown in FIG. 3.
Figure 3:
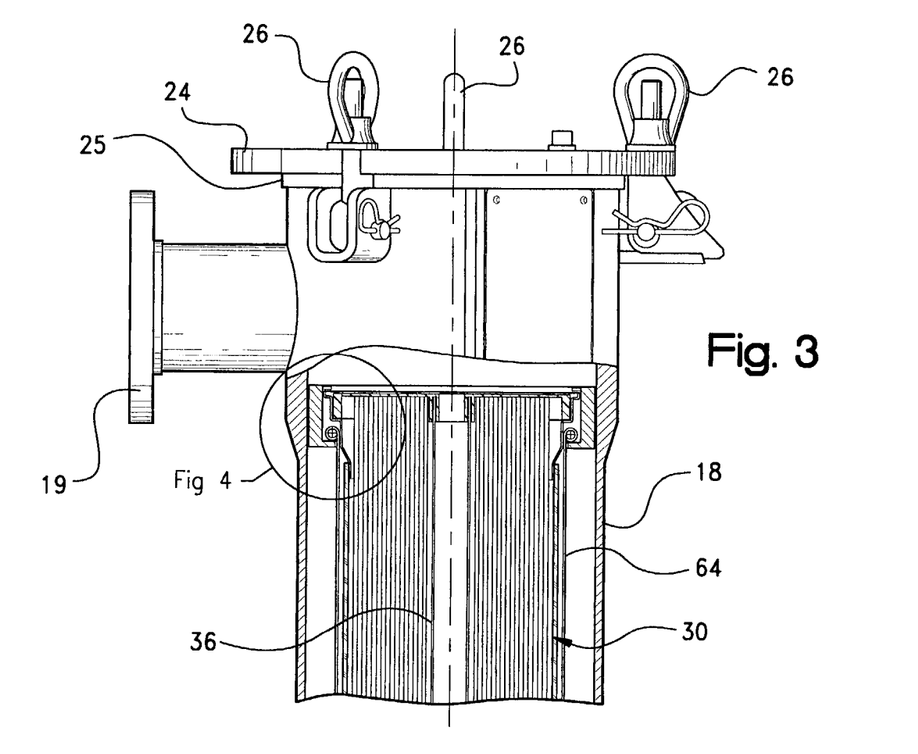
FIG. 3 is an enlarged view of a portion of the assembly shown in FIG. 2.

Referring now to FIG. 2, one of the filter assemblies in the filter stack is indicated generally at 17. The filter assembly 17 includes an elongated, cup-shaped housing or canister 18 with inlet and outlet fittings 19, 20. Support legs 21 support the assembly at an appropriate height, while flange 22 allows the assembly to be fastened to a support surface. Inlet and outlet fittings 19, 20 are connected within a diesel fuel system, such as for example in a marine application with a scrubber, between the water discharge line from the exhaust scrubber and the discharge port in the side of a boat. Multiple assemblies can be connected in parallel or series, if necessary due to the application. In other applications, the filter would be connected at another appropriate location in the fluid system, typically upstream from components which are susceptible to damage from contaminants in the system. While inlet fitting 19 is shown attached to the upper end of the canister, and outlet fitting 20 is shown attached to the lower end, it is noted that this is only exemplary in nature, and the inlet and outlet fittings could be located at other locations on the assembly, as should be apparent to those skilled in the art.

In any case, a cover 24 encloses an open end 25 of the canister, and closure members 26 are provided integral with the canister to removably attach the cover to the canister. A threaded attachment or other attachment means could of course alternatively be provided to attach the cover to the canister. In any case, the above components are all standard, commercially-available components, that should be well-known to those skilled in the art.

A filter element, indicated generally at 30 is located internally of the canister, and is designed to remove hydrocarbons and other particulate and contaminants from the fluid system. Referring now to FIGS. 3–6, element 30 includes an outer filter bag 32, and an inner filter mat 34, located around an elongated, perforated cylindrical support core 36.

Figure 5:
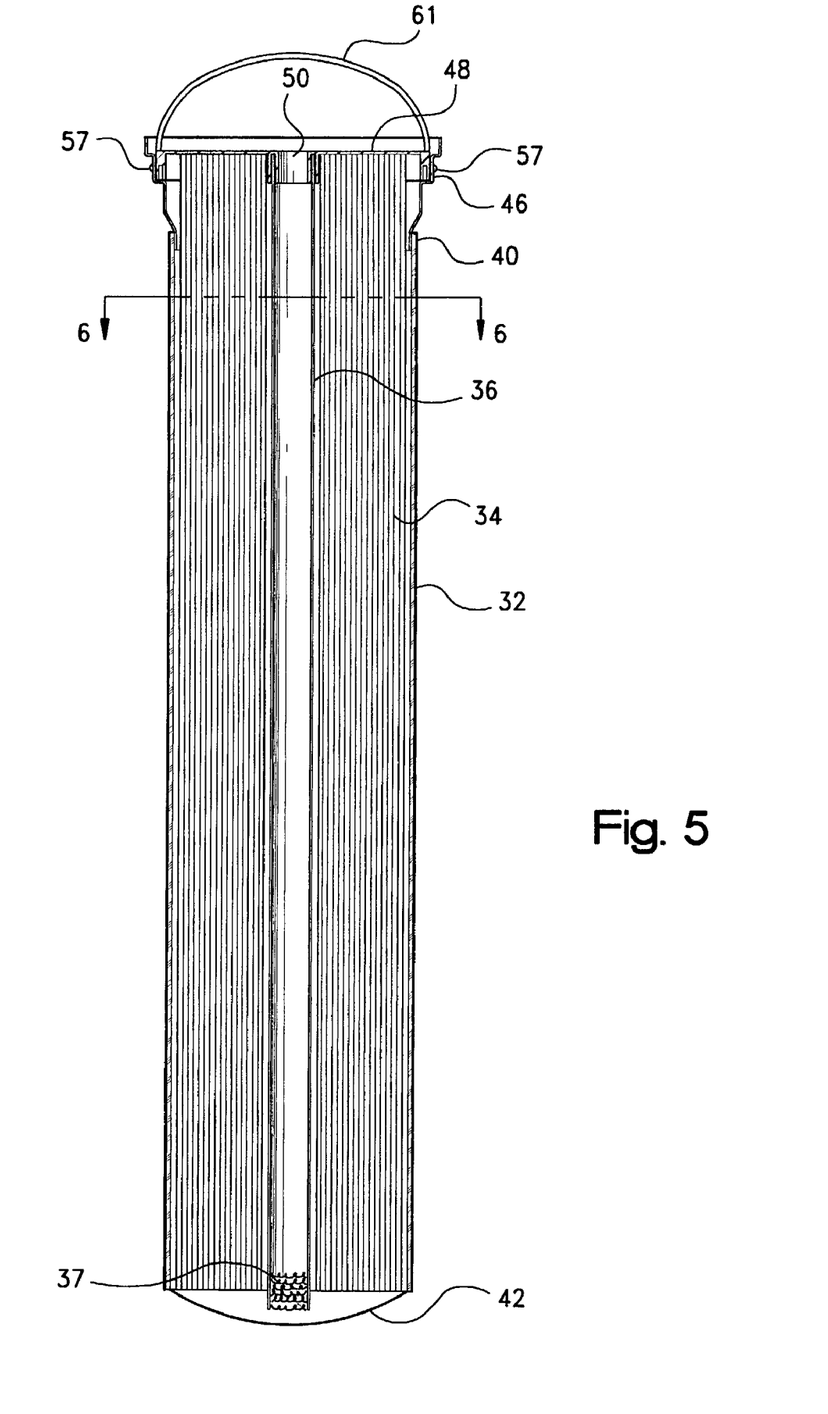
FIG. 5 is a cross-sectional side view of the filter element for the assembly.
Figure 6:
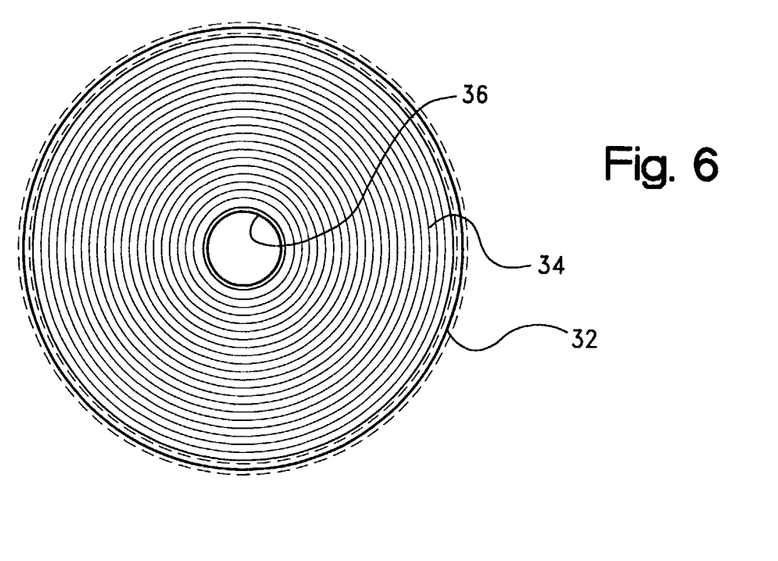
FIG. 6 is a top end view of the filter element, taken substantially along the plane defined by the lines 6—6 in FIG. 5.

The inner filter mat 34 is preferably formed from a polyolefin, such as polypropylene, however, other appropriate materials include polyethylene, or polymers such as polyester, polyamide, polyvinyl chloride or polyacrylonitrile. Other less preferred materials include wool, esparto, yucca, cellulose, glass, rayon or admixtures thereof. Methods for manufacturing the inner filter mat into an appropriate porous layer are also conventional and well-known to those skilled in the art. One preferred method is to form a needled-fibrous matrix. The matrix can be formed by a needling machine which commonly known in the industry.

Inner filter mat 34 has a density (efficiency) appropriate for the particular application for initial separation (pre-filtration) of emissions and contaminants from marine diesel exhaust. The particular density chosen for the media can vary depending upon the filtration requirements.

The perforated support core 36 is also formed from appropriate light weight material such as polypropylene.

The inner filter mat 34 is formed in long sheets, cut to an appropriate length and width, and then rolled up around the central support core 36 by automated machinery into a multi-layer tubular form to form a depth filter. Hot melt adhesive can be applied along the starting and leading edges to secure the mat to the core, and to prevent unwinding. Compression rollers can be used to direct the mat around the core. The rollers vary the density in the mat and control the diameter of the inner filter mat by varying the compression on the mat. The mat can have a uniform density; or the rollers can create a variable density, such as a density which is minimum at the inner surface and increases (becomes less porous) radially outward from the inner surface to the outer surface. The number of layers of inner filter media wound around the core can vary depending upon the initial thickness of the inner filter mat, the amount of compression provided by the rollers on the mat, and the desired overall diameter of the filter element. Preferably multiple windings are used, although it is possible that only a single winding would be appropriate in some applications.

The lower end of the wound mat and support core is then closed, such as by inserting a short plug of media 37 in the open end of the core. The plug can be secured within the end of the core such as by hot melt adhesive. Alternatively, a second impervious end cap can be attached to the lower end of the element.

Figure 7:
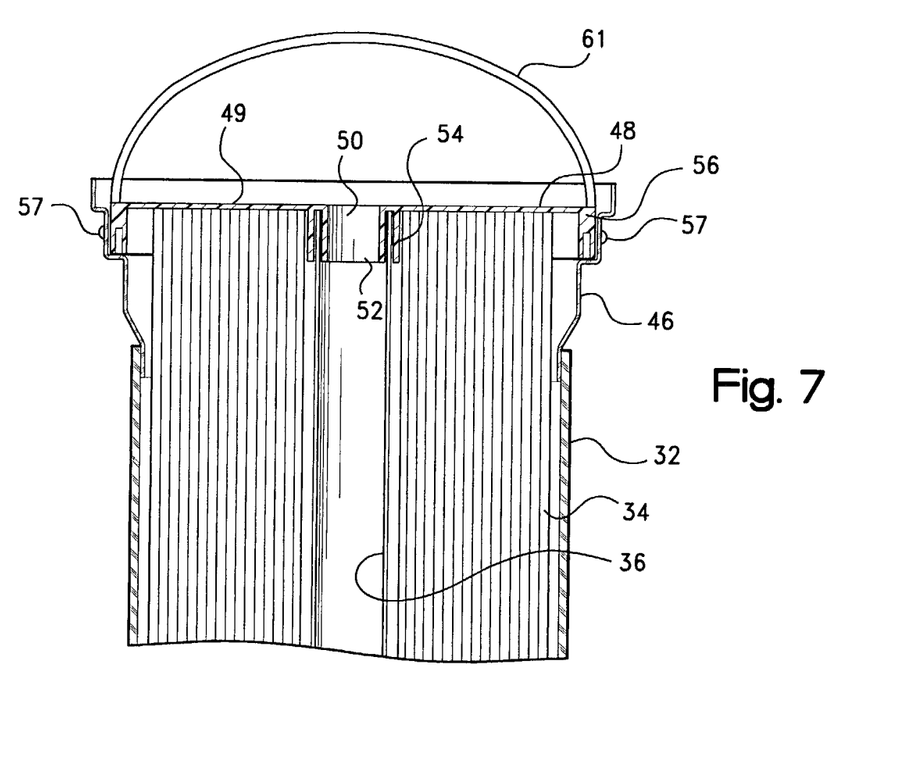
FIG. 7 is an enlarged view of a portion of the element shown in FIG. 5.

An end cap 48 is then fixed to the upper end of the element. End cap 48 is preferably formed from plastic or other lightweight, inexpensive material, and as shown in FIG. 7, includes an impervious annular body portion 49, with a central opening 50 defined by an annular flange 52 unitary (in one piece) with the end cap and projecting axially inward a short distance into the filter element. Annular flange 52 inwardly bounds the central support core 36; while a second annular flange 54 is also provided, also unitary with the end cap, which outwardly bounds the central support core 36. The core is thereby received in the annular pocket defined by the flanges 52, 54, which ensures a fluid-tight seal with the central support core 36. Standard adhesive is used to sealingly bond the end cap to the end of the mat material, and to the support core.

End cap 48 further includes a peripheral flange 56, also unitary with the end cap and circumscribing the end cap, and projecting a short distance from the end cap toward the other end of the element.

The outer filter bag 32 is then received over the rolled mat. The outer bag is similar in structure to the inner filter mat, and also preferably comprises a needled polypropylene material. The outer bag includes an open end 40 that receives the inner mat, and an opposite closed end 42. The bag is formed by bringing together the side edges and lower edges of a sheet of the material, and sewing or adhesively securing the edges together. The outer bag has a density somewhat greater than the inner mat material, and preferably has a density at least twice the density of the inner mat, for final separation of emissions and particulate from the marine diesel exhaust. Again, the density of the outer bag could vary depending upon the particular application. The thickness of the outer bag is considerably less than the thickness of the inner mat, such that the bag has significant flexibility. Preferably the bag has a size that closely surrounds the inner mat, to aid in supporting the inner mat, and in making a tight element.

An annular, relatively rigid bag ring 46 (see also FIGS. 4 and 7), formed from e.g., injection-molded polypropylene, is provided around the open end of the bag for support, and is fixedly attached (sealed) to the open end of the bag using, e.g., sonic welding, stitching, adhesive or other appropriate means. As illustrated, bag ring 46 preferably inwardly supports the open end of the bag.

Bag ring 46 closely receives and surrounds the end cap 48, and is fixed to the annular peripheral flange 56 around the end cap, such as by pop rivets 57, or by other means such as sonic welding or adhesive. As illustrated in FIG. 7, the bag ring 46 preferably includes a short annular, radially-projecting segment 58, which is located against the inner distal end of the end cap flange 56; and an annular segment 59, which radially outwardly bounds the flange 56 on the end cap; and a radially-enlarged annular mouth 60 at the upper open end of the ring.

A handle 61 can be formed or attached on the end cap, to facilitate the handling of the element. Handle 61 is preferably captured by hooks (not shown) which are molded into the end cap.

Referring now to FIG. 4, the canister includes an annular basket seat ring 62 which is welded or otherwise fixed to the canister 18 toward the upper end, and includes a radially-inward projecting annular lip or shoulder 63. A perforated cup-shaped basket 64, which receives and provides support for the filter element, is received within the canister, and includes an upper curled annular end 66 which is received in basket seat ring 62 and supported by shoulder 63. The radial segment 58 of the bag ring is sized so as to seat against the curled end 66 of the basket, when the element is located in the canister. A fluid-tight seal is thereby provided between the curled end 66 of the basket, and the shoulder 63 and bag ring 46.

Figure 8:
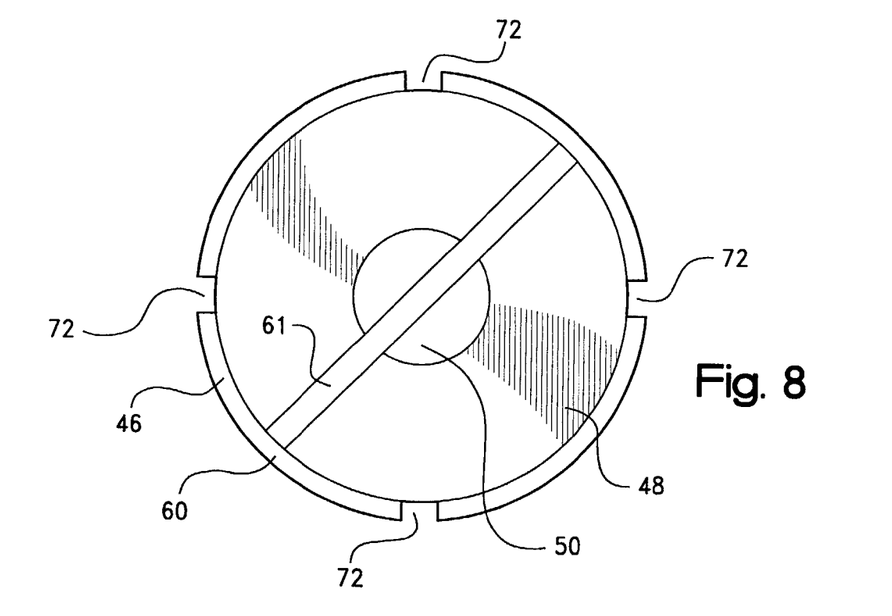
FIG. 8 is an end view of the element of FIG. 5.

Seat ring 62 of basket 64 preferably includes certain features which cooperate with the bag ring 46 to locate and retain the element in the canister. For example, the seat ring 62 can have one or more dowel pins, as at 70 (FIG. 4), projecting radially inward a short distance from the seat ring. The bag ring 46 can have notches or grooves 72 (FIG. 8) in the enlarged mouth portion 60 which receive the pins 70 when the element is properly located in the seat ring, and allow the element to drop down into proper position within the canister. The element can then be rotated to lock the element in the canister, with the dowel pins riding against the outer (upper) edge of the mouth portion 60. This serves the dual function of properly locating the element in the canister, and ensuring only an appropriate element is used within the canister by the appropriate selection and location of the dowel pins and notches.

Figure 9:
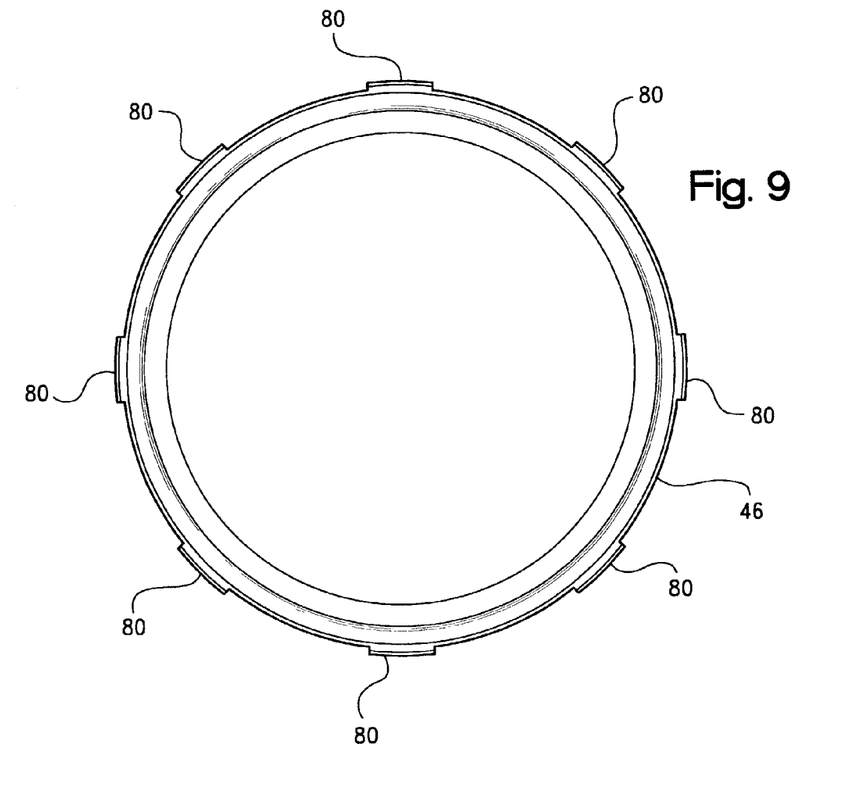
FIG. 9 is a top plan view of a further embodiment of a bag ring for the filter element.
Figure 10:
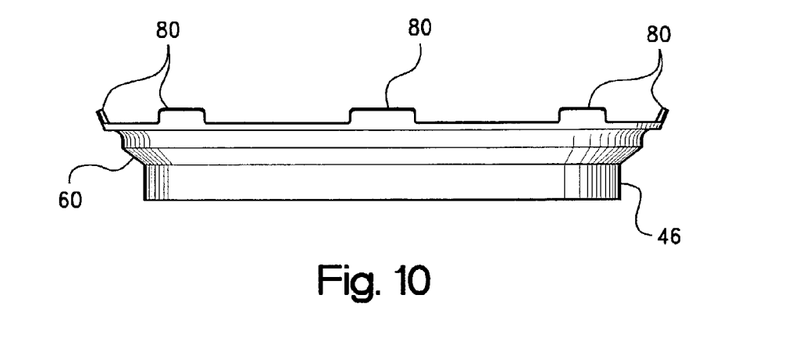
FIG. 10 is a side view of the bag ring of FIG. 10.
Figure 11:
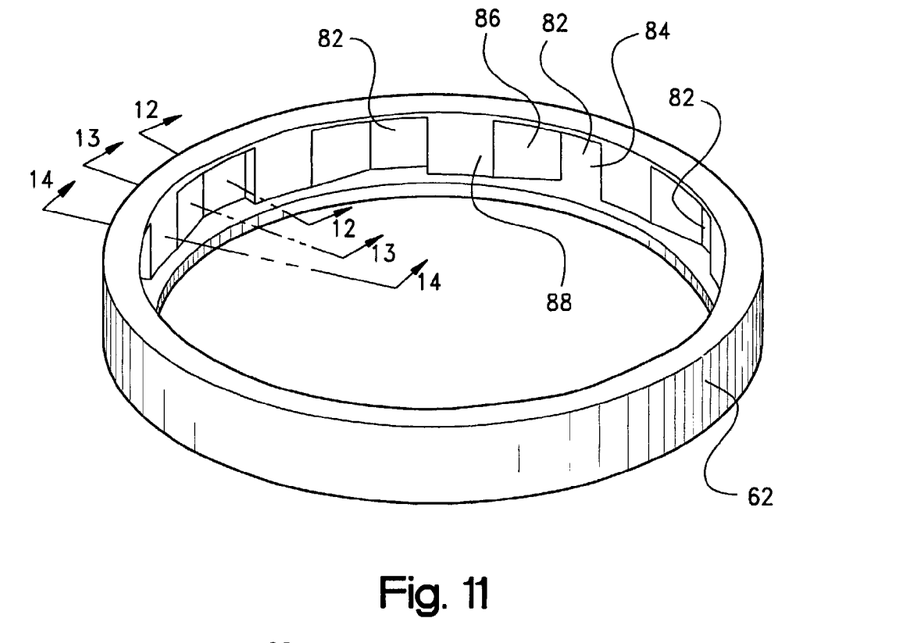
FIG. 11 is an elevated perspective view of a further embodiment of the seat ring.
Figure 12:
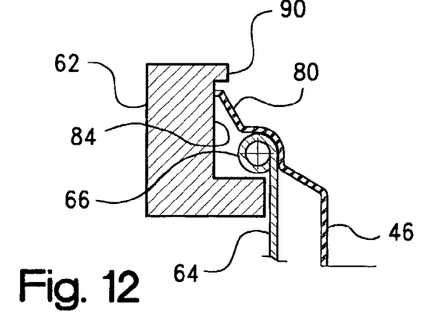
FIG. 12 is a cross-sectional side view of the seat ring of FIG. 11, shown assembled with the bag ring of FIGS. 9 and 10, taken substantially along the plane described by the line 12—12 of FIG. 11.

Alternative means for locating and retaining the filter element in the housing are possible. As shown in FIGS. 9 and 10, the enlarged mouth portion 60 of the bag ring can have radially and axially outward and upwardly projecting, spaced-apart tabs as at 80. The tabs have some degree of flexibility and extend at an angle away from the distal end surface of the ring. Tabs 80 are dimensioned to be received in grooves 82 in the seat ring 62 illustrated in FIG. 11, when the bag ring is forced downwardly into the seat ring. The grooves 82 each have a locking channel portion 84, a cam or ramp portion 86 and a release portion 88, each of which are circumferentially spaced from each other along the inner surface of the ring, and have a similar axial dimensions. Ramp portion 86 is tapered so as to circumferentially interconnect the locking channel portion 84 and the release portion 88. The bag ring and seat ring are rotationally aligned such that tabs 80 fit wholly or mostly within the locking channel portion 84 when the bag ring is initially inserted axially into the seat ring. The flexibility of the tabs allows the tabs to bend inwardly somewhat as the tabs pass over the outer annular edge or lip 90 of the seat ring, and then return to their normal position, with the distal end edges of the tabs under and engaging lip 90, as illustrated in FIG. 12.

If the bag ring is initially aligned such that the tabs 80 engage the release portion 88 of the seat ring, the bag ring can then easily be rotated (clockwise in the drawings) to allow the edges of the tabs to ride down the ramp portion 86 into the locking channel portion 84.

The flexibility of the tabs facilitates providing a slight downward/inward bias on the curled end 66 of the basket, which facilitates creating a fluid-tight seal between the basket 64, the bag ring 46 and the seat ring 62.

In this position, the filter element is locked in the canister, and cannot be withdrawn.

Figure 13:
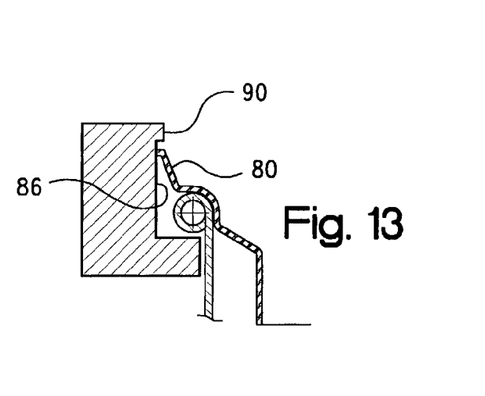
FIG. 13 is a cross-sectional side view of the seat ring with a bag ring, taken substantially along the plane described by the line 13—13 of FIG. 11.
Figure 14:
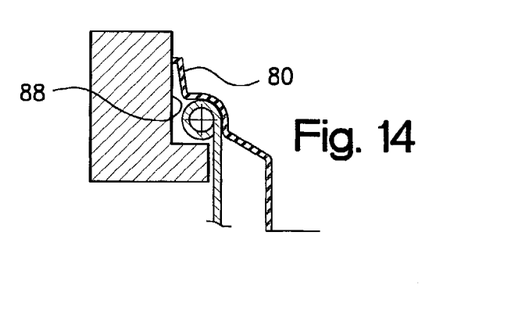
FIG. 14 is a cross-sectional side view of the seat ring with a bag ring, taken substantially along the plane described by the line 14—14 of FIG. 11.

When the element is spent, the bag ring can be rotated in an appropriate direction (counter-clockwise in the drawings), such that the tabs ride up the ramp portion 86 and are somewhat bent inwardly (see FIG. 13); and then upon further rotation, are bent even further inwardly as the tabs ride against the release portion 88. As can be seen in FIG. 14, as the tabs enter the release portion, they are released from engagement with the lip 90, as the release portion has the same diameter as the inner surface of the ring, and the bag ring (and the filter element) can be removed from the bag seat by simply pulling the element axially outward from the canister.

If desirable, radially-inward directed dowel pins or other geometry could be located along the release portion 88 of the seat ring to serve as rotational stops for the tabs. The user thereby clearly knows when the bag ring has been rotated sufficiently such that the element can be pulled out of the canister.

The tabs 80 and grooves 82 are dimensioned and spaced as appropriate, and the number of grooves is chosen, so as to provide sufficient locking and retention of the bag ring in the seat ring, and yet allow easy removal of the element when the element becomes spent. In one application, the tabs were spaced 30 degrees apart, and each tab extended approximately 15 degrees; while the locking portion 84, cam portion 86 and release portion 88 each extended 15 degrees around the seat ring, in immediate repetition.

While two locating and retaining means are described above and shown, it should be appreciated that still other alternatives exist for locating and retaining the filter element in the canister. It should also be appreciated that the bag ring locking and retaining means described above can also be used without an inner rolled element and support core, that is, it can be used in applications which only require a filter bag.

In any case, when the element is properly located in the canister as described above, the cover is then secured, and the filter can be used in the scrubber system to remove hydrocarbons and other contaminants. It should be appreciated that the element is easily removed from the housing and can be replaced when necessary. The material used in the construction of the element is preferably environmentally friendly, and can be disposed of in a land fill or by other means.

In one marine diesel application, where the filter element was used in the EPS 5000 Exhaust Processing System manufactured by EcoSound of Tarpon Springs, Fla., and installed in a dual-engine 147 foot yacht, the filter reduced the hydrocarbon discharge of the fluid stream to below 15 ppm with over 500 hours of service, while processing over 45 gallons of liquid per minute. This is believed a significant improvement over prior techniques. In the application, the inner filter mat had an initial thickness of about 0.25 inches, a length of twenty seven (27) inches, and a density of 50 microns (average separated particle size), and was wound nine (9) times around the central core; while the outer bag had a thickness of 0.125 inches and a density of 25 microns. Four filters, connected in parallel, were used. The liquid velocity was reduced to about 0.4 ft/min as it passed through the outer bag, which it is believed facilitates removing the burned and unburned hydrocarbons from the gas stream. It is believed the filter element had significant increases in its hydrocarbon and contaminant-holding capacity because of its outer bag and inner rolled mat surface. Again, the above is only one example of a liquid application for this invention, and it is believed the invention can be used in a wide variety of fluid applications in the marine and non-marine industry.

Thus, as described above, the filter of the present invention thereby removes hydrocarbon emissions and other contaminants from diesel exhaust gasses and has a reduced cost, is simple to manufacture, install and maintain, and has an improved operating life before replacement is necessary. The filter is particularly useful in scrubber systems in marine applications to remove hydrocarbons and other contaminants from a liquid stream passing through the scrubber.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. A filter assembly including a canister with a closed end, an open end, and inlet and outlet ports into the canister, a cover enclosing the open end of the canister, the canister including an annular seat ring, a cup-shaped bag screen supported by the seat ring in the canister, and a filter element supported in the canister by the seat ring, the filter element including a filter media bag with a closed end and an opposite open end, a rigid annular bag ring supporting the open end of the bag, the bag ring including a series of flexible, spaced-apart tabs projecting outward, radially and axially, at an angle from a distal end of the bag ring, the seat ring including a series of circumferentially extending and radially-inward facing grooves on an inner surface thereof, the end edges of the tabs cooperating and engaging with the grooves to retain the filter element in the canister when the bag ring is inserted into the seat ring, and the tabs are rotationally aligned with the grooves.

2. The filter assembly as in claim 1, wherein the grooves each include a radially inner surface having: i) a circumferentially-extending locking channel portion inwardly set from the inner surface and defining an outer lip which is engaged by the distal end edges of the tabs to retain the element in the canister; ii) a release portion flush with the inner surface which allows the tabs to pass the seat ring so that the element can be removed from the canister; and iii) a tapered ramp portion interconnecting the locking channel portion and the release portion.

3. A filter assembly including a canister with a closed end, an open end, and inlet and outlet ports into the canister, and a cover enclosing the open end of the canister, the canister including an annular seat ring supported toward the open end, a cup-shaped bag screen supported by the seat ring in the canister, and a filter element supported in the canister by the seat ring, the filter element having a first end and an opposite second end, a rigid annular support ring fixed to the first end of the filter element, the support ring including a series of flexible, spaced-apart tabs projecting outward, radially and axially, at an angle from a distal end of the support ring, the seat ring including a series of circumferentially extending and radially-inward facing grooves on an inner surface thereof, end edges of the tabs on the support ring cooperating and engaging with the grooves in the seat ring to retain the filter element in the canister when the support ring is inserted axially into the seat ring and rotated, and the tabs are rotationally aligned with the grooves.

4. The filter assembly as in claim 3, wherein the grooves each include a radially inner surface having: i) a circumferentially-extending locking channel portion inwardly set from the inner surface and defining an outer lip which is engaged by the distal end edges of the tabs to retain the element in the canister and prevent the element from being axially removed therefrom; ii) a release portion flush with the inner surface which allows the tabs to pass the seat ring so that the element can be inserted and removed from the canister; and iii) a tapered ramp portion interconnecting the locking channel portion and the release portion.

5. The filter assembly as in claim 4, wherein the seat ring is fixed to the canister at the open end thereof.

* * * * *